Patented Feb. 1, 1938

2,106,960

UNITED STATES PATENT OFFICE 2,106,960

PRODUCTION OF HIGHLY VISCOUS OILS

Mathias Pier and August Eisenhut, Heidelberg, Germany, assignors to I. G. Farbenindustrie Aktiengesellschaft, Frankfort-on-the-Main, Germany No Drawing. Application June 13, 1935, Serial No. 26,518. In Germany June 28, 1934

6 Claims. (Cl. 196—13)

The present invention relates to the production of highly viscous oils, especially oils of the character of lubricating oils. More particularly this invention relates to an improvement of the process forming the subject-matter of our copending application Ser. No. 730,360, filed June 12th, 1934.

It has already been proposed to prepare high quality lubricating oils from paraffin waxes or other waxes, especially those of high molecular weight, preferably of a molecular weight of at least 250, or mixtures thereof containing considerable amounts of the said substances, by exposing them to the action of silent electric discharges, or by treating them with halogen or other exchangeable substituents and subsequently subjecting them to condensation, or by splitting them or dehydrogenating them advantagously by treatment with halogen and splitting off halogen hydride, the cleavage or dehydrogenation products being polymerized or condensed, as described for example in the British specification No. 349,071.

It is a characteristic feature of the aforesaid processes that the initial material, namely paraffin waxes or related materials of comparatively high molecular weight, are subjected to a treatment which results in a polymerization or condensation of the initial materials to form high molecular products. These products may therefore be generically termed "high molecular paraffin wax condensation products" and this expression will be used hereinafter and in the appended claims to designate products of the said kind.

It is an improvement in such "high molecular paraffin wax condensation products" that the present invention is more particularly concerned with.

In our aforesaid copending application Ser. No. 730,360 we have described and claimed a process, according to which the said "high molecular paraffin wax condensation products" are improved by treating them at elevated temperatures above 25° C., if desired under pressure, with hydrocarbons the critical temperature of which lies below 250° centigrade, especially with liquefied normally gaseous hydrocarbons. The said treatment is carried out at temperatures which are below the critical temperature of the said hydrocarbons. It has, however, been found that somewhat higher temperatures, up to 50° C. above the critical temperature, may also be used. By the said treatment, paraffin waxes and/or other substances injuriously affecting the nature of the products to be obtained are dissolved out while a highly viscous oil remains undissolved.

We have now found that the said process can be carried out with special advantage and the properties of the resulting highly viscous oil can be still further considerably improved by subsequently treating the latter with other selective solvents than the aforesaid hydrocarbon solvents. As such solvents may be mentioned for example phenols, as for example phenol or cresol, or aromatic nitro compounds, as for example nitrobenzene, or mixtures of the aforesaid substances, or ketones, as for example acetone and cyclohexanone, keto-acids, as for example laevulinic acid and pyroracemic acid; aniline, furfurol, liquid sulphur dioxide or chlorinated ethers are also suitable. The selective solvents may be employed alone or in admixture with each other or with other solvents, as for example with liquefied normally gaseous hydrocarbons.

It may be advantageous to work at increased pressure. Ordinary or slightly elevated temperatures may be employed, advantageously temperatures between about 20° and about 50° centigrade, although higher or somewhat lower temperatures may be employed. The solvents may be employed in the same amount as the oil to be treated or preferably in a multiple of the said amount.

The oil treated with solvent usually still contains small amounts of the selective solvent which may be removed in any desired way, as for example by distilling off, if desired with the aid of steam, or by washing out.

The treated oils have a specially great activity as agents for lowering setting points.

The following example will further illustrate how this invention may be carried out in practice, but the invention is not restricted to this example.

Example

Ceresine is exposed to the action of silent electric discharges and the resulting product is treated at 90° centigrade with three times its volume of propane in a closed vessel. A part of the product is thus dissolved in the propane; this consists mainly of unchanged ceresine. The undissolved oily fraction is freed from propane and mixed with an equal amount of illuminating oil. The mixture obtained is treated at ordinary temperature with 1½ times the amount of phenol or with nitrobenzene at 50° centigrade. About 5 per cent, calculated with reference to the highly viscous oil, dissolves in the solvent. The layers formed are separated. The oil layer is freed by distillation from the illuminating oil added as a diluent and from small amounts of phenol or nitrobenzene dissolved in the layer. The product thus treated has an activity as an agent for lowering setting points which is from 15 to 20 per cent higher than that of the product which has not been treated with phenol or nitrobenzene.

Mixtures of phenol and nitrobenzene may be employed instead of one of these solvents.

What we claim is:—

1. The process of producing a highly viscous oil which comprises subjecting a crude "high molecular paraffin wax condensation product" to extraction by means of a hydrocarbon, the critical temperature of which is below 250° C., at a temperature above 25° C., and subjecting that portion of the product which remains undissolved to extraction by means of a selective solvent other than said hydrocarbons.

2. The process of producing a highly viscous oil which comprises subjecting a crude "high molecular paraffin wax condensation product" to extraction by means of a hydrocarbon, the critical temperature of which is below 250° C., at a temperature above 25° C., and subjecting that portion of the product which remains undissolved to extraction by means of a selective solvent other than said hydrocarbons at a temerature between about 20° and about 50° C.

3. The process of producing a highly viscous oil which comprises subjecting a crude "high molecular paraffin wax condensation product" to extraction by means of a liquefied normally gaseous hydrocarbon, at a temperature above 25° C., and subjecting that portion of the product which remains undissolved to extraction by means of a selective solvent other than said hydrocarbons at a temperature between about 20° and about 50° C.

4. The process of producing a highly viscous oil which comprises subjecting a crude "high molecular paraffin wax condensation product" to extraction by means of a liquefied normally gaseous hydrocarbon, at a temperature above 25° C., and subjecting that portion of the product which remains undissolved to extraction by means of phenol at a temperature between about 20° and above 50° C.

5. The process of producing a highly viscous oil which comprises subjecting a crude "high molecular paraffin wax condensation product" to extraction by means of a liquefied normally gaseous hydrocarbon, at a temperature above 25° C., and subjecting that portion of the product which remains undissolved to extraction by means of nitrobenzene at a temperature between about 20° and about 50° C.

6. The process of producing a highly viscous oil which comprises subjecting a crude "high molecular paraffin wax condensation product" to extraction by means of a liquefied normally gaseous hydrocarbon, at a temperature above 25° C., and subjecting that portion of the product which remains undissolved to extraction by means of a mixture of phenol and nitrobenzene at a temperature between about 20° and about 50° C.

MATHIAS PIER.
AUGUST EISENHUT.